Feb. 11, 1964 G. GRÜNEBERG ETAL 3,121,031
CATALYST SIEVE ELECTRODE AND PRODUCTION THEREWITH
OF A DIRECTED FLOW IN DEVICES FOR ELECTROCHEMICAL
CONVERSION OF LIQUID MATERIALS
Filed Jan. 12, 1959 4 Sheets-Sheet 1

INVENTORS:
GERHARD GRÜNEBERG, JOACHIM KUBISCH and HERBERT SPENGLER

By Burgers, Dinklage + Sprung
ATTORNEYS

Feb. 11, 1964 G. GRÜNEBERG ETAL 3,121,031
CATALYST SIEVE ELECTRODE AND PRODUCTION THEREWITH
OF A DIRECTED FLOW IN DEVICES FOR ELECTROCHEMICAL
CONVERSION OF LIQUID MATERIALS
Filed Jan. 12, 1959 4 Sheets-Sheet 2

INVENTORS:
GERHARD GRÜNEBERG, JOACHIM KUBISCH and HERBERT SPENGLER

By Burgers, Dinklage + Sprung

ATTORNEYS

Feb. 11, 1964   G. GRÜNEBERG ETAL   3,121,031
CATALYST SIEVE ELECTRODE AND PRODUCTION THEREWITH
OF A DIRECTED FLOW IN DEVICES FOR ELECTROCHEMICAL
CONVERSION OF LIQUID MATERIALS
Filed Jan. 12, 1959   4 Sheets-Sheet 4

INVENTORS

GERHARD GRÜNEBERG, JOACHIM and HERBERT SPENGLER

By Burgen, Dinklage & Sprung

ATTORNEYS

United States Patent Office 3,121,031
Patented Feb. 11, 1964

3,121,031
CATALYST SIEVE ELECTRODE AND PRODUCTION THEREWITH OF A DIRECTED FLOW IN DEVICES FOR ELECTROCHEMICAL CONVERSION OF LIQUID MATERIALS
Gerhard Grüneberg, Oberhausen-Holten, Joachim Kubisch, Bottrop, and Herbert Spengler, Oberhausen-Holten, Germany, assignors, by mesne assignments, to Varta Aktiengesellschaft, Frankfurt am Main, Germany, and Siemens-Schuckert-Werke Aktiengesellschaft, Erlangen, Germany, both German corporations
Filed Jan. 12, 1959, Ser. No. 786,372
Claims priority, application Germany Jan. 17, 1958
19 Claims. (Cl. 136—86)

This invention relates to a novel electrode, and more particularly to a catalyst sieve electrode, the use of which permits a reduction of the internal resistance and consequently an increase in current density in devices designed for the electrochemical conversion of liquid materials. Examples of such devices, in which said catalyst sieve electrode may be used, include electrolyzers, devices for the electrochemical oxidation and reduction of organic or inorganic materials, and particularly fuel cells for converting the chemical energy of combustible materials directly into electrical energy.

The internal resistance in such devices is made up of the ohmic resistance of the electrolyte and the contact, ohmic and polarization resistances of the electrodes. The ohmic resistance of the electrolyte is dependent upon the type of electrolyte used, the temperature and the concentration. While the resistance of the electrolyte in electrolyzers is increased by the gas which is evolved at the electrodes and which cannot be removed from the electrodes as quickly as it is formed, the resistance of the electrolyte in fuel cells is increased by the liquid and/or gaseous fuel present in the electrolyte.

The contact and ohmic resistances of the electrode are dependent upon the electical conductivity, the structure and nature of the material of the electrode body and the electrical resistance between the electrode body and the current supply terminal bushing. Finally, the polarization resistances of the electrode are caused by inhibitions due to preliminary chemical or physical reactions and/or to the electrochemical reaction proper and/or by inhibition of the equalization of the concentration of reactants and reaction products.

As is known, the internal resistance of devices for the electrochemical conversion of liquid materials can be reduced by using porous catalyst electrodes. For example, Austrian Patent No. 191,484 discloses a double skeleton catalyst electrode, which is prepared by mixing carbonyl nickel and Raney nickel powders of specific particle size, pressing the mixture to form molded bodies, sintering in a hydrogen stream and subsequent leaching the aluminum out of the Raney alloy. When ready for operation, an interlaced system of fine pores extends throughout the electrode body. The Raney catalyst is incorporated in the carrier skeleton of carbonyl nickel having low catalytic activity. These porous catalyst electrodes show outstanding performance when used for the electrochemical utilization of hydrogen in strongly alkaline fuel cells.

Thus, at 80° C. and operating pressures of 2 to 3 kg./cm.$^2$ anodic current densities of 200 to 300 ma./cm.$^2$ with polarizations of 100 to 200 mv. can be permanently drawn. The amount of charge, which can be drawn in the period between two regenerations of the electrodes, the regeneration being effected by treatment of the electrodes with concentrated alkaline solution at or at approximately the boiling temperature, subsequent treatment with alkaline solution of lower concentration in the presence of complex-forming compounds and subsequent cathodic evolution of hydrogen in a concentrated alkaline solution, is about 100 amp. hours/cm.$^2$, and the useful service life of the electrodes is in excess of 700 amp. hours/cm.$^2$.

When used for the decomposition of water in electrolyzers operating in alkaline media, these known electrodes are distinguished by particularly low cathodic overvoltage at high current density. The reduction in internal resistance is made possible by the Raney nickel catalyst of the electrode, whereby the proper electrochemical reaction $H_{ads} + OH^- \rightleftharpoons H_2O + e^-$ is highly favored and the preliminary absorption and desorption reaction

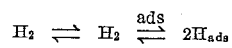

proceeds readily. Moreover, the contact and line resistances of the electrode becomes very low due to the compact incorporation of the Raney nickel catalyst in a solid carrier skeleton.

Naturally, in these porous sintered bodies, the equalization of concentration of the electrolyte and the reaction product between the interior of the pore system and the external electrolyte is relatively substantially inhibited. For this reason, the electrochemical conversion of carbon containing fuels in an alkaline electrolyte can not be accomplished satisfactorily with double skeleton catalyst electrodes since, in continuous operation in fuel cells, their narrow pores readily become plugged by carbonate and/or bicarbonate precipitates and/or condensation products due to insufficient equalization of concentration. Consequently, only the catalyst at the electrode surface on the electrolyte side which is accessible to the electrolyte-fuel mixture without substantial hindrance is available for the conversion. However, since this catalyst is subject to particularly serious attack by oxygen passing in contact therewith, only short periods of operation can be achieved with these cells.

It is therefore an object of this invention to overcome the foregoing difficulty of accomplishing concentration equalization in the electrochemical conversion of liquid materials.

A still further object of this invention is to provide a catalyst electrode having a long service life, which is more active, more insensitive to oxidizing gases and more easily and cheaply prepared.

Other and further objects will become apparent from a study of the within specification and accompanying drawings, in which FIG. 1 is a view in section of an electrode in accordance with an embodiment of the invention, showing details of construction;

Figure 1:
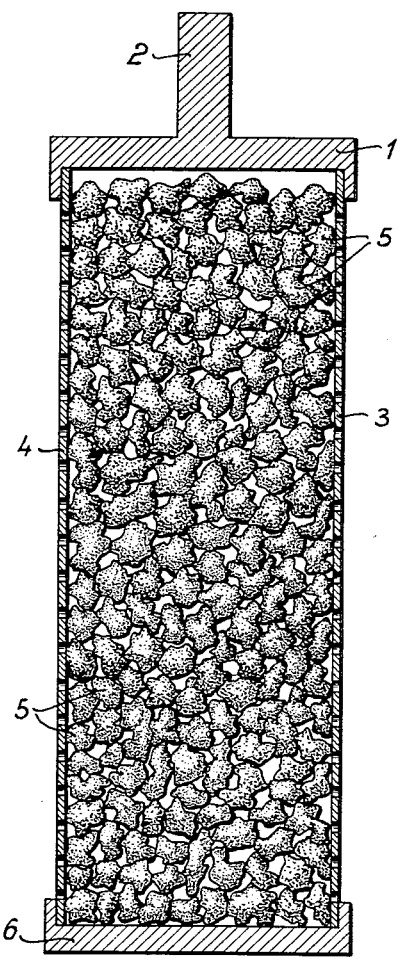

In accordance with the invention, the foregoing objects are accomplished by employing catalyst sieve electrodes in devices used for the electrochemical conversion of liquid materials, preferably fuel cells for the direct conversion of chemical energy into electrical energy and the like, said electrodes comprising two substantially parallel and electrically conducting sieves provided with means for current supply and having arranged therebetween a granular or pulverulent material having electrical conductivity and catalytic activity.

These sieves should be highly permeable. In general, the total open surface area should be from about 5 to 50% and preferably about 20 to 50% of the geometrical electrode surface area. The sieve openings may be of circular, elliptic, polygonal, slotted or other shape.

The size of openings is dependent upon the particle size of the catalyst granules or powder. In general, the hydraulic diameter of the sieve openings may be from about 1 to $2000\mu$ and preferably from 50 to $400\mu$. It is most preferred that 200 to $300\mu$ sizes be used.

The distance between the parallel walls of the sieves should be at least 1 mm. and not more than 30 mm., the preferred distance being from 3 to 10 mm. There is no limitation as to the surface area of the electrodes, the size being dependent upon the intended use.

The sieves may vary according to the catalyst powder or granules used, the particle size of which may range between $10\mu$ and 4 mm.

The thickness of the sieve walls or plates may be from about 0.03 to 3 mm. The sieves should be mounted in a support or stiffened by suitable supporting structures in a manner that a sagging or deflection of a square area of 10 x 10 cm. thereof will not be more than about 2 mm.

Instead of such micro sieves, stiffened micro wire gauzes may be used, but in this case the stiffening members must be substantially stronger, since wire gauzes tend more to deformation than rigid metal sieves.

The electrical contact between the individual catalyst particles and between said particles and the sieves is brought about by the weight of the small particle size catalyst material itself. The sieves of the electrode may take the shape of square, polygonal or circular discs. The sieves may also be constructed as coaxial cylinders with the catalytically active material being arranged in the annular space formed therebetween. The sieves may be interconnected by metal plates or inserted in frames so as to form an enclosed space provided with an opening for introducing or withdrawing the catalyst, or, quite simply, micro sieves cut to suitable form may be folded so as to obtain containers having the form of bags or envelopes or may be bent to form cubic containers.

The electrodes may be used conveniently in liquids, such as alkaline, neutral and acid electrolytes. The individual parts, i.e. the catalysts and the sieves, may be made of any conventional material for manufacturing catalyst electrodes, and even a great number of materials which, due to their specific properties, heretofore could not be processed to form compact porous electrode bodies, e.g. platinum, palladium, etc. Examples of suitable catalyst materials include nickel, cobalt, iron, silver, copper, the noble metals, particularly platinum and palladium and carbon. The metals are provided in the form of large-surface or porous bodies, e.g. as sponge or porous Raney metal granules. Furthermore, they may be deposited on catalytically inactive, but electrically conductive carrier materials. Of course, carbon may be activated as well by depositing metals thereon.

The sieves used in accordance with the invention may be made of the metals enumerated above, prepared preferably by conventional galvanic or mechanical methods.

The micro sieves are themselves inactive or at least preferably less active than the catalyst material. When using metallic catalysts, the sieves may be made either of the same metal forming the active component in the catalyst or of a material which, in the electrochemical series of metals, is a neighboring metal thereto in order to prevent or to minimize the formation of localized cell activity with the catalyst. In preparing the electrodes, the catalyst is chosen according to the type of reactants to be converted and the composition of the electrolyte. Of course, the catalyst and the sieves as well must be resistant to the particular electrolyte used, the reactants and the intermediate and final products of the reaction.

The sieves serve not only for the purpose of holding the small particle size catalyst together and leading off the electrons therefrom, but also to protect the catalyst from coming into contact with gases escaping from the other electrode. In the case of using liquid fuels, the sieves permit unhindered access of the electrolyte-fuel mixture to the entire surface of the catalyst and permit particularly easy equalization of concentration of the electrolyte-fuel-reaction product mixture, which equalization heretofore was substantially aggravated and disrupted in conventional compact porous electrode bodies, e.g. double skeleton catalyst electrodes.

A further advantage of these electrode bodies assembled in accordance with the invention lies in the fact that the individual members can be varied depending upon the requirements to be met by the electrode, and furthermore that exhausted electrodes can be rapidly prepared for re-use by removing and regenerating the catalyst. The electrodes in accordance with the invention are rapidly and cheaply manufactured and, due to their construction, are of higher mechanical strength than the rigid electrode bodies heretofore used, which become useless on the whole when they have been partially damaged. The high degree of adaptability of the catalyst sieve electrode is also of advantage if new catalytic materials are to be tested for applicability in approved devices, since the tedious processes of production, which were heretofore unavoidable in the case of compact electrodes, need not be used. The life of the sieves is practically unlimited. Therefore, it is only necessary to refill the sieves with the regenerated catalyst to obtain once again a fully operable electrode. In contrast to this, double skeleton catalyst electrodes are very brittle and must be discarded in total when mechanically damaged.

The catalyst sieve electrodes of the invention are more active by at least one order of magnitude than double skeleton catalyst electrodes because they are constituted practically entirely of catalytic material. For the reasons set forth above, the concentration polarization is substantially lower as compared with that of double skeleton catalyst electrodes. This advantage is so important that it more than offsets the somewhat higher contact resistance resulting from the loose structure of the catalyst material of the electrode.

Particular advantages are offered by the electrodes in accordance with the invention if, in the devices wherein they are used, it is desired that the flow of the reactants, i.e. the electrolyte and the final and intermediate products of the reaction, proceed in a given direction without having recourse to external means as, for example, mechanical pumps or the application of thermosiphon principles. It is possible with the electrodes of the invention to achieve such directed flow by designing the sieves confronting or facing each other in such a manner as to offer variations in resistance to the flow of the gas produced. Substantially all of the gas evolved at the catalyst of the electrode escapes in form of bubbles from that side of the catalyst sieve electrode where the sieve offering the lower resistance to the flow of the gas bubbles is located. Different resistances to the flow can be produced by providing different permeabilities of the sieves and/or by using sieve openings with different hydraulic diameters and/or by providing different arrangements of conically constricted or funnel-shaped sieve openings. The sieves having the higher permeability and/or larger hydraulic diameters of sieve openings in this case are located on that side of the electrode where the larger amount of gas is to flow off or the sieves are arranged in a manner that the funnel-shaped extensions or the conical constrictions are directed to that side of the electrode where the larger amount of gas is to flow off.

The different resistances to flow of the micro sieves may be accomplished by any combination of the constructional arrangements mentioned above with respect to permeability, hydraulic diameter of sieve openings and funnel-shaped openings or conical constrictions. It is possible, for example, to combine two sieves with funnel-shaped or conically constricted openings in an electrode assembly with the hydraulic diameters of sieve openings of one sieve being different from those of the other sieve.

Use may be made of sieves with high permeability with the total area of sieve openings being preferably from about 10 to 30% of the geometric electrode surface area. The ratio range of the permeability of the two sieves may be from about 2:1 to 100:1.

The different resistances to the flow, may be determined in accordance with the fact that the sizes of openings of the two sieves are in the ratio of 2:1 to 100:1.

A further potential use of the electrode of the invention results from the fact that automatic control of reactions proceeding in fuel cells with formation of gas is possible by choosing a specific range of hydraulic diameters of the sieve openings or by using a specific shape of sieve openings. The conversion of liquid fuels on catalyst electrodes involves the evolution of hydrogen by a catalyzed dehydrogenation or decomposition reaction. Part of this hydrogen, the amount depending on the anodic current drawn, is converted electrochemically, i.e. by combustion, to water while the other part is combined to form molecular hydrogen and tends to escape from the catalyst with formation of gas bubbles. An operating condition, where the hydrogen evolved from a hydrogen-formation reaction is immediately subjected to quantitative electrochemical conversion at any one time, while not completely realizable, can be approximated at least by controlling the operation of the fuel cells as by varying, for example, the amount of current drawn, the temperature, etc.

It is possible to influence this rate of hydrogen formation within certain limits in dependence on the anodic current drawn and to store the hydrogen in form of bubbles and keep it so stored for early subsequent use by choosing the hydraulic diameter of the sieve openings and/or by arranging the funnel-shaped extensions or conical constrictions of the sieve openings such that a high resistance is offered to the passage of gas bubbles formed from the hydrogen evolved on the catalyst while the liquid mixture of electrolyte, fuel and reaction product is allowed to pass under a lower resistance to flow.

This high resistance to the flow of gases, as compared with the lower resistance to the flow of the liquid mixture of electrolyte, fuel and reaction product, is achieved in various manners. Thus, the sieves may either be provided with small openings having a hydraulic diameter of 1 to 200$\mu$ and preferably of 10 to 150$\mu$ with the most preferred range being between 30 and 100$\mu$, or the sieves may be provided with funnel-shaped extensions or conical constrictions and arranged in a manner that the funnel-shaped extensions or conical constrictions face the catalytically active material.

Referring to the drawings, FIG. 1 shows an electrode comprising two identical micro sieves 3 and 4, arranged between a cover plate 1 having a terminal 2 and the base plate 6. Arranged therebetween is a finely divided catalyst partially shown at 5.

Figure 2:
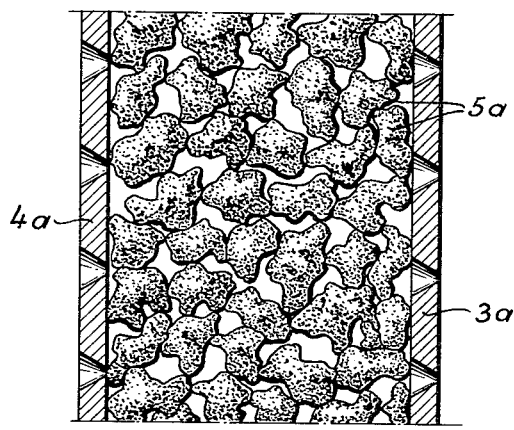
FIG. 2 is a sectional view of a portion of an electrode in accordance with the invention having conically constricted sieve openings.

FIGS. 2 to 5 illustrate different arrangements for obtaining different resistances to flow. Thus, FIG. 2 represents a section of an electrode having parts similar to those of FIG. 1. The sieve plates in this case are provided with conically constricted sieve openings with both sieves 3a and 4a having the same permeability and the same hydraulic diameters of sieve openings. The preferred gas flow direction is indicated by the arrow. The catalytically active material is shown at 5a.

Figure 3:
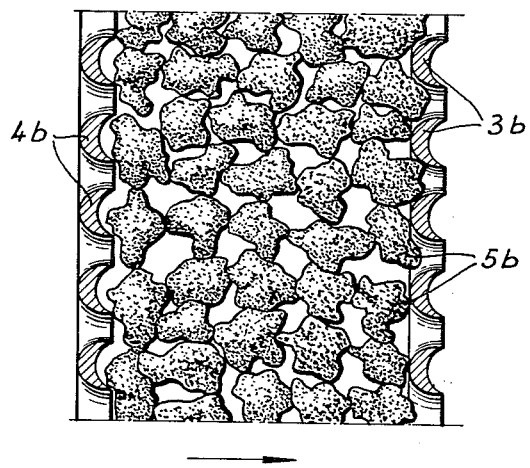
FIG. 3 is a view similar to that of FIG. 2 having funnel-shaped sieve openings.

FIG. 3 likewise represents a section of an electrode, the sieve plates 3b and 4b, which are provided with funnel-shaped extensions with both sieves having the same permeability and the same hydraulic diameters of sieve openings. The preferred gas flow direction is in the direction of the arrow. The catalytically active material is shown at 5b.

Figure 4:
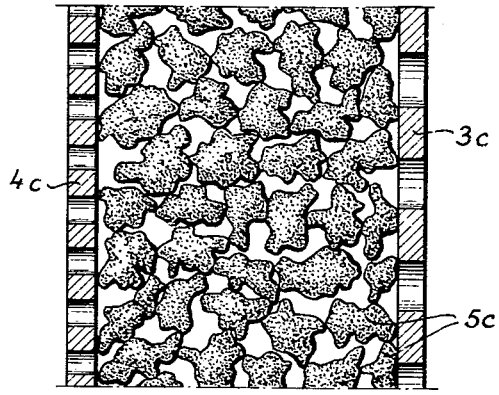
FIG. 4 is a view similar to that of FIG. 3 having sieve openings of different hydraulic diameters.

FIG. 4 represents a section of an electrode, the sieve plates 3c and 4c of which have the same permeability, but have openings of different hydraulic diameters. Substantially all of the gas flows in the direction of the arrow, i.e. towards the side with larger hydraulic diameters. 5c represents the catalytically active material.

Figure 5:
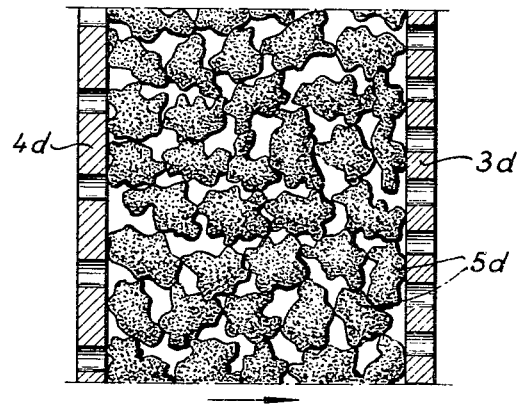
FIG. 5 is a view similar to that of FIG. 4 having openings of the equal size.

FIG. 5 represents a section of an electrode, the sieves 3d and 4d of which have different permeabilities, but equal sizes of perforations. Substantially all of the gas flows in the direction of the arrow, i.e. towards the side of the sieve having the higher permeability. 5d is the catalytically active substance.

Figure 6:
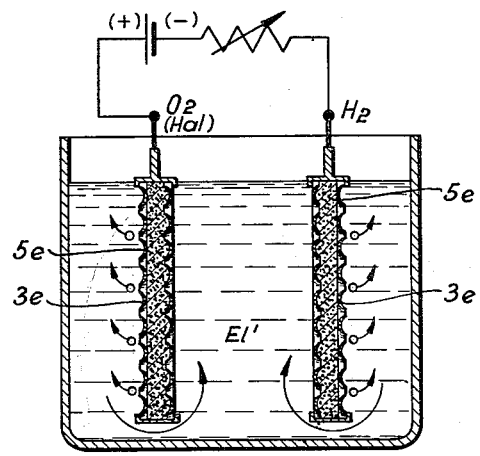
FIG. 6 is a schematic view of the electrolytic cell embodiment used in accordance with the invention.

FIG. 6 shows an electrolytic cell in accordance with an embodiment of the invention, more fully discussed hereinbelow.

Figure 7:
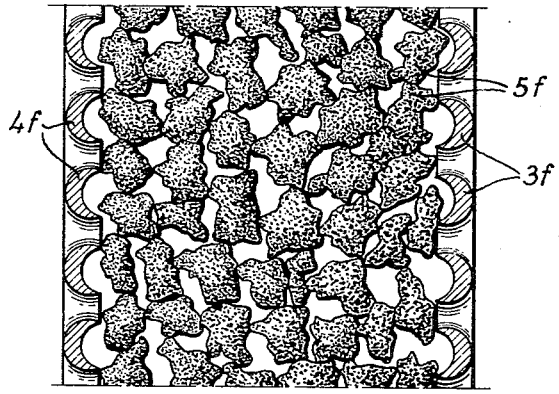
FIG. 7 is a view similar to that of FIG. 3 having funnel-shaped sieve openings inwardly facing.

FIG. 7 shows a sectional view of part of an electrode, the use of which permits the achievement of control of reactions which proceed with the evolution of gas. 3f and 4f are micro sieves, the funnel-shaped perforations of which face the catalytically active material 5f.

In accordance with the following examples, the nature of the electrodes of the invention, their possible uses and the processes capable of being carried out therewith are set forth. Example 1 illustrates the mode of action of an electrode provided with two identical micro sieves, while Examples 2 through 4 illustrate the production of directed flows in operating different fuel cells. It will be understood that these examples are given by way of illustration, and the invention is not to be limited thereto.

*Example 1*

Two identical micro sieves made of nickel having a total open surface area of 29%, perforations of 300$\mu$ diameter and a thickness of 70$\mu$ are arranged in parallel position spaced apart a distance of 4 mm. Arranged between the sieves is a bed of granular Raney nickel catalyst of 0.5 to 2 mm. diameter particle size. Based on equal volume and equal geometric surface area, this catalyst sieve electrode is more active by 1 order of magnitude as compared with catalyst electrodes hitherto known, e.g. nickel double skeleton catalyst electrodes. While a nickel double skeleton catalyst electrode operated in an alkaline fuel cell (6-normal KOH, 100° C.) electrochemically utilized formate with a permanent anodic current density of about 20 ma./cm.$^2$ and was highly susceptible to attack by oxygen originating from the oxidation electrode combined with the fuel electrode, a catalyst sieve electrode of the above type was operated under the same conditions with a permanent anodic current density of 200 ma./cm.$^2$ and did not show by far the sensitivity to oxygen.

*Example 2*

A catalyst sieve electrode, consisting of platinum micro sieves having arranged therebetween an active carbon catalyst activated with platinum, produced gaseous carbon dioxide in addition to hydrogen by catalytic decomposition of formic acid in an acid electrolyte comprising sulfuric acid. While the hydrogen evolved in combusted electrochemically with formation of water, care has to be taken that the gaseous carbon dioxide and the water obtained as a reaction product will not escape into the electrolyte space between the fuel electrode and the oxidation electrode fed with oxygen, since both of the oxidation products are effective in reducing the conductivity of the electrolyte. In this case, successful application was made of the principle of self-acting flow control such that the gas flow emerged from the back face of the fuel electrode (i.e. from that side which does not face the oxidation electrode). Fresh fuel-electrolyte mixture then was correspondingly automatically drawn in from the front face of the electrode.

Example 3

A catalyst sieve electrode, consisting of platinum micro sieves having sandwiched therebetween platinum sponge metal produced gaseous nitrogen in addition to hydrogen by catalytic decomposition of hydrazine when an acid electrolyte was used and produced gaseous nitrogen and gaseous ammonia in addition to hydrogen in an alkaline electrolyte.

Here again, the design of the sieves and/or their arrangement was such that the nitrogen which was not utilized electrochemically and also that part of the ammonia which was not utilized electrochemically, according to the operating conditions, flowed out at the back face of the catalyst sieve electrode, rather than escaped from the front face of the catalyst electrode to proceed into the electrolyte space between the fuel electrode and the oxidation electrode. As to the hydrogen likewise evolved, only that portion escaped which was not consumed by the anodic current drawn.

Example 4

A particularly useful application of the principle above described is for the protection of the fuel electrode from the gas of the oxidation electrode if no other non-utilizable gaseous product is obtained in addition to hydrogen. This is the case where mono- or polyhydric alcohols, formaldehyde or formate are catalytically dehydrogenated on a Raney nickel catalyst of a nickel catalyst sieve electrode in a strongly alkaline electrolyte. To protect the catalyst from oxygen evolved at one electrode, the hydrogen coming from the dehydrogenation reaction and not consumed by the anodic current drawn was allowed to escape from the front face of the catalyst sieve electrode. In this manner, the oxygen-containing electrolyte was forced away from the catalyst sieve electrode and fresh fuel-electrolyte was correspondingly automatically drawn in from the back face of the electrode.

As already mentioned above, the process in accordance with the invention is applicable not only to electrodes used in fuel cells, but also to electrodes used in hydrolysis and to electrodes used for the electrochemical oxidation and reduction of organic and inorganic materials. The advantages involved in such use may be illustrated by comparing a conventional electrolysis arrangement with an electrolytic cell as used in accordance with the present invention.

In conventional electrolytic cells the gas evolved at the electrodes always covers part of the electrode surface, thereby locally increasing the current density and consequently the polarization at the electrode. Moreover, the electrolyte resistance between the electrodes is increased by the forming gas bubbles. Furthermore, for separating the gases, diaphragms or protective gauzes arranged between the electrodes must be used. Further disadvantages include a relatively high concentration polarization and, if porous electrodes are used, such as double skeleton catalyst electrodes, a small depth of penetration of the current lines results.

In the electrolyzer in accordance with the invention (FIG. 6) the gas is evolved at the granular catalyst 5e arranged between two micro sieves 3e arranged unidirectionally with respect to their funnel-shaped openings. With this arrangement of sieves the gases evolved preferably flow out from the back faces of the electrodes and the electrolyte E1' preferably flows in from the front face. In contrast to conventional electrolyzers, the conductivity of the electrolyte E1' between the two electrodes is fully preserved, the concentration polarization is lower, the separation of gases is improved and the catalytically active surface area of the electrodes is substantially increased by the granular form of the catalyst.

In accordance with the invention, the process of self-acting control of the rate of hydrogen formation (measured in mols $H_2$ per unit time and unit geometric electrode surface area) may be readily understood with reference to the principle of the Kipp apparatus as applied to small volume ranges of the catalyst sieve electrode. Hydrogen evolved between the sieves as a result of a dehydrogenation or decomposition reaction, and not being utilized electrochemically as it is formed, will form bubbles which in turn force a corresponding volume of the liquid electrolyte-fuel mixture away from the catalyst and out of the electrode without substantial hindrance, thereby slowing down the rate of hydrogen evolution. The escape of the gaseous hydrogen, in contrast to that of the liquid, is largely prevented in the present invention by the small sieve openings which, in this case, might possess a hydraulic diameter of from 1 to $200\mu$, or by providing the micro sieve openings with funnel-shaped extensions or conical constrictions. When drawing an anodic current, the accumulated hydrogen is passed into solution electrochemically through the sieve perforations which are not covered by gas bubbles. The result is that the gas cushion becomes smaller and more liquid electrolyte-fuel mixture reaches the catalyst, thereby increasing again the rate of hydrogen evolution.

Of course, with this type of catalyst sieve electrode, which is designed to some extent for economy in fuel consumption and for a high degree of protection of the catalyst from oxidizing gases, the amount of charge which, with the same polarization, can be drawn per unit time is lower than that obtainable with the above mentioned catalyst sieve electrodes having micro sieves with maximum permeability or catalyst sieve electrodes with automatic directed flow. The specific type of catalyst sieve electrodes which is suited for the particular use can be readily ascertained by means of a simple preliminary test. However, the principle of self-acting flow may be applied for avoiding these choking-off effects in cases where no other gases (e.g. $N_2$ or $CO_2$) which are no longer utilizable are formed besides the hydrogen evolved from a dehydrogenation or decomposition reaction. This is particularly true for the dehydrogenation of monohydric or polyhydric alcohols, formaldehyde or alkali formate on Raney metal catalyst material (preferably Raney nickel) of the catalyst sieve electrodes in a strongly alkaline electrolyte and/or alkaline hydrolyzed electrolyte (e.g. $K_2CO_3$, $Na_2CO_3$).

What is claimed:

1. Catalyst sieve electrode comprising a pair of spaced apart electrically conductive sieve means forming an electrode interior therebetween and being provided with current terminal means, said sieve means having sieve flow path openings with a hydraulic diameter between about 1–2000 microns, and individual granules of electrically conductive and catalytically active divided material being loosely disposed in direct conductive contact with one another within said electrode interior between said sieve means, the openings of one of said sieve means with respect to the openings of the other sieve means being of number and dimension such that when the electrode is immersed in an electrolyte liquid, any flow penetration of gas bubbles through said one sieve means from said interior to the exterior of the electrode is substantially completely inhibited, while liquid flow penetration therethrough is permitted.

2. Catalyst sieve electrode comprising a pair of spaced apart electrically conductive sieve means forming an electrode interior therebetween and being provided with current terminal means; said sieve means being spaced apart between about 1–30 mm., having a wall thickness between about 0.03–3 mm., and a total open surface between about 5–50% of the geometrical electrode surface area; and individual granules of electrically conductive and catalytically active divided material having a particle size between about 10 microns-4 mm. being loosely disposed in direct conductive contact with one another within said electrode interior between said sieve means, one of said sieve means having openings of smaller hydraulic diameter than the sieve openings of the other sieve means, the openings of said one sieve means being between 1–200 microns and the openings of the other seive means being at most about 2000 microns, such that when the electrode is immersed in an electrolyte liquid, any flow penetration of gas bubbles through the sieve means having the openings of smaller hydraulic diameter from said interior to the exterior of the electrode is substantially completely inhibited, while liquid flow penetration therethrough is permitted as well as flow penetration of gas bubbles through the other sieve means from the interior to the exterior of the electrode.

3. Catalyst sieve electrode comprising a pair of spaced apart electrically conductive sieves means forming an electrode interior therebetween and being provided with terminal means; said sieve means being spaced apart between about 1–30 mm., having a wall thickness between about 0.03–3 mm., having sieve openings with a hydraulic diameter between about 1–2000 microns, and having a total open surface between about 5–50% of the geometrical electrode surface area; and individual granules of electrically conductive and catalytically active divided material having a particle size between about 10 microns–4 mm. being loosely disposed in direct conductive contact with one another within said electrode interior between said sieve means, one of said sieve means having a total area of openings less than the total area of openings of the other sieve means for providing a difference in permeability between the two sieve means within the range between about 1:2–100, such that when the electrode is immersed in an electrolyte liquid, any flow penetration of gas bubbles through the sieve means with the lesser total area of openings from said interior to the exterior of the electrode is substantially completely inhibited, while liquid flow penetration therethrough is permitted as well as flow penetration of gas bubbles through the other sieve means from the interior to the exterior of the electrode.

4. Catalyst sieve electrode comprising a pair of spaced apart electrically conductive sieve means forming an electrode interior therebetween and being provided with current terminal means; said sieve means being spaced apart between about 1–30 mm., having a wall thickness between about 0.03–3 mm., having sieve openings with a hydraulic diameter between about 1–2000 microns, and having a total open surface between about 5–50% of the geometrical electrode surface area; and individual granules of electrically conductive and catalytically active divided material having a particle size between about 10 microns–4 mm. being loosely disposed in direct conductive contact with one another within said electrode interior between said sieve means, one of said sieve means having funnel-shaped sieve openings outwardly converging from the interior to the exterior of the electrode and the other of said sieve means having funnel-shaped sieve openings outwardly diverging from the interior to the exterior of the electrode, such that when the electrode is immersed in an electrolyte liquid, any flow penetration of gas bubbles through the sieve means with the outwardly diverging openings from said interior to the exterior of the electrode is substantially completely inhibited, while liquid flow penetration therethrough is permitted as well as flow penetration of gas bubbles through the other sieve means from the interior to the exterior of the electrode.

5. Catalyst sieve electrode comprising a pair of spaced apart electrically conductive sieve means forming an electrode interior therebetween and being provided with current terminal means; said sieve means being spaced apart between about 1–30 mm., having a wall thickness between about 0.03–3 mm., having sieve openings with a hydraulic diameter between about 1–200 microns, and having a total open surface between about 5–50% of the geometrical electrode surface area; and individual granules of electrically conductive and catalytically active divided material having a particle size between about 10 microns–4 mm. being loosely disposed in direct conductive contact with one another within said electrode interior between said sieve means, both of said sieve means being catalytically inactive with respect to any reactions proceeding at the electrode and both sieve means having funnel-shaped sieve openings outwardly diverging from the interior to the exterior of the electrode, such that when the electrode is immersed in an electrolyte liquid, any flow penetration of gas bubbles through each of the sieve means from said interior to the exterior of the electrode is substantially completely inhibited, while liquid flow penetration therethrough is permitted.

6. Catalyst sieve electrode comprising a pair of spaced apart electrically conductive sieve means forming an electrode interior therebetween and being provided with current terminal means; said sieve means being spaced apart between about 1–30 mm., having a wall thickness between about 0.03–3 mm., having sieve openings with a hydraulic diameter between about 1–2000 microns, and having a total open surface between about 5–50% of the geometrical electrode surface area; and individual granules of electrically conductive and catalytically active divided material having a particle size between about 10 microns–4 mm. being loosely disposed in direct conductive contact with one another within said electrode interior between said sieve means, said sieve means comprising spaced apart coaxial cylinders with said divided material being disposed within the electrode interior annular space formed between said coaxial cylinders, the openings of one of said sieve means with respect to the openings of the other sieve means being of number and dimension such that when the electrode is immersed in an electrolyte liquid, any flow penetration of gas bubbles through said one sieve means from said interior to the exterior of the electrode is substantially completely inhibited, while liquid flow penetration therethrough is permitted.

7. Electrode according to claim 1 wherein the divided material is selected from the group consisting of metals of groups IB and VIII of the Mendelejeff Perodic System, and activated carbon.

8. Electrode according to claim 7 wherein the divided material is Raney metal.

9. Electrode according to claim 7 wherein the divided material is a catalytic metal deposited on carbon.

10. Electrode according to claim 7 wherein the sieve means and the divided material are made of the same catalytic metal.

11. Catalyst sieve electrode comprising a pair of spaced apart electrically conductive sieve means forming an electrode interior therebetween and being provided with current terminal means; said sieve means being spaced apart between about 1–30 mm., having a wall thickness between about 0.03–3 mm., having sieve openings with a hydraulic diameter between about 1–2000 microns, and having a total open surface between about 5–50% of the geometrical electrode surface area; and individual granules of electrically conductive and catalytically active divided material having a particle size between about 10 microns–4 mm. being loosely disposed in direct conductive contact with one another within said electrode interior between said sieve means, one of said sieve means having conically constricted sieve openings outwardly converging from the interior to the exterior of the electrode and the other of said sieve means having conically constricted sieve openings outwardly diverging from the interior to the exterior of the electrode, such that when the electrode is immersed in an electrolyte liquid, any flow penetration of gas bubbles through the sieve means with the outwardly diverging openings from said interior to the exterior of the electrode is substantially completely inhibited, while liquid flow penetration therethrough is permitted as well as flow penetration of gas bubbles through the other sieve means from the interior to the exterior of the electrode.

12. Catalyst sieve electrode comprising a pair of spaced apart electrically conductive sieve means forming an electrode interior therebetween and being provided with current terminal means; said sieve means being spaced apart between about 1–30 mm., having a wall thickness between about 0.03–3 mm., having sieve openings with a hydraulic diameter between about 1–200 microns, and having a total open surface between about 5–50% of the geometrical electrode surface area; and individual granules of electrically conductive and catalytically active divided material having a particle size between about 10 microns-4 mm. being loosely disposed in direct conductive contact with one another within said electrode interior between said sieve means, both of said sieve means being catalytically inactive with respect to any reactions proceeding at the electrode and both sieve means having conically constricted sieve openings outwardly diverging from the interior to the exterior of the electrode, such that when the electrode is immersed in an electrolyte liquid, any flow penetration of gas bubbles through each of the sieve means from said interior to the exterior of the electrode is substantially completely inhibited, while liquid flow penetration therethrough is permitted.

13. In the process of operating electrochemical cell devices for electrochemical conversions with attendant evolution of gas in which the substance to be electrochemically converted is dissolved in the electrolyte, said devices containing opposing electrodes immersed in the electrolyte, at least one of said electrodes being a catalyst sieve electrode, said catalyst sieve electrode having a pair of spaced apart electrically conductive sieve means forming a sieve electrode interior therebetween and being provided with current terminal means, and individual granules of electrically conductive and catalytically active divided material being loosely disposed in direct conductive contact with one another within said electrode interior between said sieve means, the improvement which comprises carrying out such electrochemical conversion operation of the device while producing a directed flow into the electrolyte of evolved gas by using such catalyst sieve electrode as the electrode where gas is evolved, the corresponding catalyst sieve electrode where gas is evolved being provided with sieve means having sieve openings of a hydraulic diameter between about 1–2000 microns, the openings of one of said sieve means respect to the openings of the other sieve means of said corresponding sieve electrode being provided of number and dimension such that any flow penetration of gas bubbles through said one sieve means from the interior to the exterior of the same electrode is substantially completely inhibited, while liquid flow penetration therethrough is permitted as well as flow penetration of gas bubbles through the other sieve means of the same electrode from the interior to the exterior thereof, whereby the electrolyte during cell operation passes into the sieve electrode interior through that sieve means which inhibits flow penetration of gas bubbles therethrough while the evolved gas passes in the form of bubbles outwardly from the sieve electrode interior into the electrolyte through the other sieve means of said corresponding electrode, the same sieve electrode being positioned in the cell device with respect to the opposing electrode such that a predetermined unidirectional flow of electrolyte into said electrode interior and a corresponding unidirectional flow of gas bubbles outwardly therefrom is achieved.

14. In the process of operating electrochemical cell devices for electrochemical conversions with attendant evolution of gas in which the substance to be electrochemically converted is dissolved in the electrolyte, said devices containing opposing electrodes immersed in the electrolyte, at least one of said electrodes being a catalyst sieve electrode, said catalyst sieve electrode having a pair of spaced apart electrically conductive sieve means forming a sieve electrode interior therebetween and being provided with current terminal means, and individual granules of electrically conductive and catalytically active divided material being loosely disposed in direct conductive contact with one another within said electrode interior between said sieve means, the improvement which comprises carrying out such electrochemical conversion operation of the device while producing a directed flow into the electrolyte of evolved gas by using such catalyst sieve electrode as the electrode where gas is evolved, the corresponding catalyst sieve electrode where gas is evolved being spaced apart between about 1–30 mm. and having a thickness between about 0.03–3 mm. and a total open surface between about 5–50% of the geometrical electrode surface area, said divided material having a particle size between about 10 microns and 4 mm., one of said sieve means of said corresponding sieve electrode having openings of smaller hydraulic diameter than the sieve openings of the other sieve means of the same electrode, the openings of said one sieve means being between 1–200 microns and the openings of the other sieve means being at most about 2000 microns, such that any flow penetration of gas bubbles through the sieve means having the openings of smaller hydraulic diameter from the interior to the exterior of the same electrode is substantially completely inhibited, while liquid flow penetration therethrough is permitted as well as flow penetration of gas bubbles through the other sieve means of the same electrode from the interior to the exterior thereof, whereby the electrolyte during cell operation passes into the sieve electrode interior through that sieve means having the smaller diameter openings while the evolved gas passes in the form of bubbles outwardly from the sieve electrode interior into the electrolyte through the other sieve means of said corresponding electrode, the same sieve electrode being positioned in the cell device with respect to the opposing electrode such that a predetermined unidirectional flow of electrolyte into said electrode interior and a corresponding unidirectional flow of gas bubbles outwardly therefrom is achieved.

15. In the process of operating electrochemical cell devices for electrochemical conversions with attendant evolution of gas in which the substance to be electrochemically converted is dissolved in the electrolyte, said devices containing opposing electrodes immersed in the electrolyte, at least one of said electrodes being a catalyst sieve electrode, said catalyst sieve electrode having a pair of spaced apart electrically conductive sieve means forming a sieve electrode interior therebetween and being provided with current terminal means, and individual granules of electrically conductive and catalytically active divided material being loosely disposed in direct conductive contact with one another within said electrode interior between said sieve means, the improvement which comprises carrying out such electrochemical conversion operation of the device while producing a directed flow into the electrolyte of evolved gas by using such catalyst sieve electrode as the electrode where gas is evolved, the corresponding catalyst sieve electrode where gas is evolved being provided with sieve means having sieve openings of a hydraulic diameter between about 1–2000 microns, said sieve means of said corresponding electrode being spaced apart between about 1–30 mm. and having a thickness between about 0.03–3 mm. and a total open surface between about 5–50% of the geometrical electrode surface area, said divided material having a particle size between about 10 microns and 4 mm., one of said sieve means of said corresponding sieve electrode having a total area of openings less than the total area of openings of the other sieve means of the same electrode for providing a difference in permeability between the two sieve means within the range between about 1:2–100, such that any flow penetration of gas bubbles through the sieve means having the lesser total area of openings from the interior to the exterior of the same electrode is substantially completely inhibited, while liquid flow penetration therethrough is permitted as well as flow penetration of gas bubbles through the other sieve means of the same electrode from the interior to the exterior thereof, whereby the electrolyte during cell operation passes into the sieve electrode interior through that sieve means having the lesser total area of openings while the evolved gas passes in the form of bubbles outwardly from the sieve electrode interior into the electrolyte through the other sieve means of said corresponding electrode, the same sieve electrode being positioned in the cell device with respect to the opposing electrode such that a predetermined unidirectional flow of electrolyte into said electrode interior and a corresponding unidirectional flow of gas bubbles outwardly therefrom is achieved.

16. In the process of operating electrochemical cell devices for electrochemical conversions with attendant evolution of gas in which the substance to be electrochemically converted is dissolved in the electrolyte, said devices containing opposing electrodes immersed in the electrolyte, at least one of said electrodes being a catalyst sieve electrode, said catalyst sieve electrode having a pair of spaced apart electrically conductive sieve means forming a sieve electrode interior therebetween and being provided with current terminal means, and individual granules of electrically conductive and catalytically active divided material being loosely disposed in direct conductive contact with one another within said electrode interior between said sieve means, the improvement which comprises carrying out such electrochemical conversion operation of the device while producing a directed flow into the electrolyte of evolved gas by using such catalyst sieve electrode as the electrode where gas is evolved, the corresponding catalyst sieve electrode where gas is evolved being provided with sieve means having sieve openings of a hydraulic diameter between about 1–2000 microns, said sieve means of said corresponding electrode being spaced apart between about 1–30 mm. and having a thickness between about 0.03–3 mm. and a total open surface between about 5–50% of the geometrical electrode surface area, said divided material having a particle size between about 10 microns and 4 mm., one of said sieve means of said corresponding sieve electrode having funnel-shaped sieve openings outwardly converging from the interior to the exterior of the same electrode and the other of said sieve means of said same electrode having funnel-shaped sieve openings outwardly diverging from the interior to the exterior of the same electrode, such that any flow penetration of gas bubbles through the sieve means having the outwardly diverging openings from the interior to the exterior of the same electrode is substantially completely inhibited, while liquid flow penetration therethrough is permitted as well as flow penetration of gas bubbles through the other sieve means of the same electrode from the interior to the exterior thereof, whereby the electrolyte during cell operation passes into the sieve electrode interior through that sieve means having the outwardly diverging openings while the evolved gas passes in the form of bubbles outwardly from the sieve electrode interior into the electrolyte through the other sieve means of said corresponding electrode, the same sieve electrode being positioned in the cell device with respect to the opposing electrode such that a predetermined unidirectional flow of electrolyte into said electrode interior and a corresponding unidirectional flow of gas bubbles outwardly therefrom is achieved.

17. In the process of operating electrochemical cell devices for electrochemical conversions with attendant evolution of gas in which the substance to be electrochemically converted is dissolved in the electrolyte, said devices containing opposing electrodes immersed in the electrolyte, at least one of said electrodes being a catalyst sieve electrode, said catalyst sieve electrode having a pair of spaced apart electrically conductive sieve means forming a sieve electrode interior therebetween and being provided with current terminal means, and individual granules of electrically conductive and catalytically active divided material being loosely disposed in direct conductive contact with one another within said electrode interior between said sieve means, the improvement which comprises carrying out such electrochemical conversion operation of the device while producing a directed flow into the electrolyte of evolved gas by using such catalyst sieve electrode as the electrode where gas is evolved, the corresponding catalyst sieve electrode where gas is evolved being provided with sieve means having sieve openings of a hydraulic diameter between about 1–2000 microns, said sieve means of said corresponding electrode being spaced apart between about 1–30 mm. and having a thickness between about 0.03–3 mm. and a total open surface between about 5–50% of the geometrical electrode surface area, said divided material having a particle size between about 10 microns and 4 mm., one of said sieve means of said corresponding sieve electrode having conically constricted sieve openings outwardly converging from the interior to the exterior of the same electrode and the other of said sieve means of the same electrode having conically constricted sieve openings outwardly diverging from the interior to the exterior of the same electrode, such that any flow penetration of gas bubbles through the sieve means having the outwardly diverging openings from the interior to the exterior of the same electrode is substantially completely inhibited, while liquid flow penetration therethrough is permitted as well as flow penetration of gas bubbles through the other sieve means of the same electrode from the interior to the exterior thereof, whereby the electrolyte during cell operation passes into the sieve electrode interior through that sieve means having the outwardly diverging openings while the evolved gas passes in the form of bubbles outwardly from the sieve electrode interior into the electrolyte through the other sieve means of said corresponding electrode, the same sieve electrode being positioned in the cell device with respect to the opposing electrode such that a predetermined unidirectional flow of electrolyte into said electrode interior and a corresponding unidirectional flow of gas bubbles outwardly therefrom is achieved.

18. Process for producing self-acting control of reactions proceeding with the evolution of hydrogen gas in fuel cells for the direct conversion of the chemical energy of liquid fuel which is dissolved in the electrolyte into electrical energy, said fuel cell containing in addition to the electrolyte-fuel liquid mixture a hydrogen electrode and an oxygen electrode immersed in said liquid mixture, said hydrogen electrode being a catalyst sieve electrode having a pair of spaced apart electrically conductive sieve means forming a sieve electrode interior therebetween and being provided with current terminal means, and individual granules of electrically conductive and catalytically active divided material being loosely disposed in direct conductive contact with one another within said electrode interior between said sieve means, which comprises maintaining the resistance of the openings of the sieve means to flow penetration of gas bubbles forming from the hydrogen evolved on the divided material of such hydrogen electrode higher than the resistance to flow penetration of the liquid mixture, by using as the hydrogen electrode a catalyst sieve electrode with sieve openings having a hydraulic diameter between about 1–200 microns, with sieve means spaced apart between about 1–30 mm. and having a sieve wall thickness between about 0.03–3 mm. and a total open surface between about 5–50% of the geometrical electrode surface area, with both sieve means being catalytically inactive with respect to reactions proceeding at the hydrogen electrode, with both sieve means having funnel-shaped sieve openings outwardly diverging from the interior of the electrode to the exterior thereof, and with the catalytically active divided material having a particle size between about 10 microns–4 mm., such that when current is drawn from the cell any flow penetration of gas bubbles through each of the sieve means from said interior to the exterior of the electrode is substantially completely inhibited while liquid flow penetration therethrough is permitted, and when current ceases to be drawn from the cell any flow penetration of gas bubbles through each of the sieve means from said interior to the exterior of the electrode remains substantially completely inhibited while liquid flow penetration through each of the sieve means from the exterior to said interior of the electrode is also substantially completely inhibited by the back pressure of the gas cushion developing in the interior of the electrode as a result of the further evolution of hydrogen gas which proceeds until the liquid is completely displaced from contact with the catalytically active divided material therein.

19. Process for producing self-acting control of reactions proceeding with the evolution of hydrogen gas in fuel cells for the direct conversion of the chemical energy of liquid fuel which is dissolved in the electrolyte into electrical energy, said fuel cell containing in addition to the electrolyte-fuel liquid mixture a hydrogen electrode and an oxygen electrode immersed in said liquid mixture, said hydrogen electrode being a catalyst sieve electrode having a pair of spaced apart electrically conductive sieve means forming a sieve electrode interior therebetween and being provided with current terminal means, and individual granules of electrically conductive and catalytically active divided material being loosely disposed in direct conductive contact with one another within said electrode interior between said sieve means, which comprises maintaining the resistance of the openings of the sieve means to flow penetration of gas bubbles forming from the hydrogen evolved on the divided material of such hydrogen electrode higher than the resistance to flow penetration of the liquid mixture, by using as the hydrogen electrode a catalyst sieve electrode with sieve openings having a hydraulic diameter between about 1–200 microns, with sieve means spaced apart between about 1–30 mm. and having a sieve wall thickness between about 0.03–3 mm. and a total open surface between about 5–50% of the geometrical electrode surface area, with both sieve means being catalytically inactive with respect to reactions proceeding at the hydrogen electrode, with both sieve means having conically constricted sieve openings outwardly diverging from the interior of the electrode to the exterior thereof, and with the catalytically active divided material having a particle size between about 10 microns-4 mm., such that when current is drawn from the cell any flow penetration of gas bubbles through each of the sieve means from said interior to the exterior of the electrode is substantially completely inhibited while liquid flow penetration therethrough is permitted, and when current ceases to be drawn from the cell any flow penetration of gas bubbles through each of the sieve means from said interior to the exterior of the electrode remains substantially completely inhibited while liquid flow penetration through each of the sieve means from the exterior to said interior of the electrode is also substantially completely inhibited by the back pressure of the gas cushion developing in the interior of the electrode as a result of the further evolution of hydrogen gas which proceeds until the liquid is completely displaced from contact with the catalytically active divided material therein.

References Cited in the file of this patent

UNITED STATES PATENTS

| 208,003 | Wenzel | Sept. 1878 |
| 1,182,759 | Emanuel | May 9, 1916 |
| 2,384,463 | Gunn et al. | Sept. 11, 1945 |
| 2,925,454 | Justi et al. | Feb. 16, 1960 |
| 2,928,891 | Justi et al. | Mar. 15, 1960 |
| 2,969,315 | Bacon | Jan. 24, 1961 |

FOREIGN PATENTS

| 350,100 | France | Aug. 4, 1905 |
| 199,736 | Great Britain | June 22, 1923 |
| 273,045 | Great Britain | June 30, 1927 |

UNITED STATES PATENT OFFICE
CERTIFICATE OF CORRECTION

Patent No. 3,121,031            February 11, 1964

Gerhard Grüneberg et al.

It is hereby certified that error appears in the above numbered patent requiring correction and that the said Letters Patent should read as corrected below.

Column 2, line 12, for "absorption" read -- adsorption --; line 16, for "becomes" read -- become --; column 6, line 62 for "in combusted" read -- is combusted --; column 9, line 15, after "with" insert -- current --; column 11, line 44, after "means" insert -- with --.

Signed and sealed this 23rd day of June 1964.

(SEAL)
Attest:

ERNEST W. SWIDER            EDWARD J. BRENNER
Attesting Officer            Commissioner of Patents